W. L. RINGLING AND G. GREENLEE.
LOCKING DEVICE FOR DEMOUNTABLE WHEELS.
APPLICATION FILED MAR. 30, 1917.
1,317,393. Patented Sept. 30, 1919.
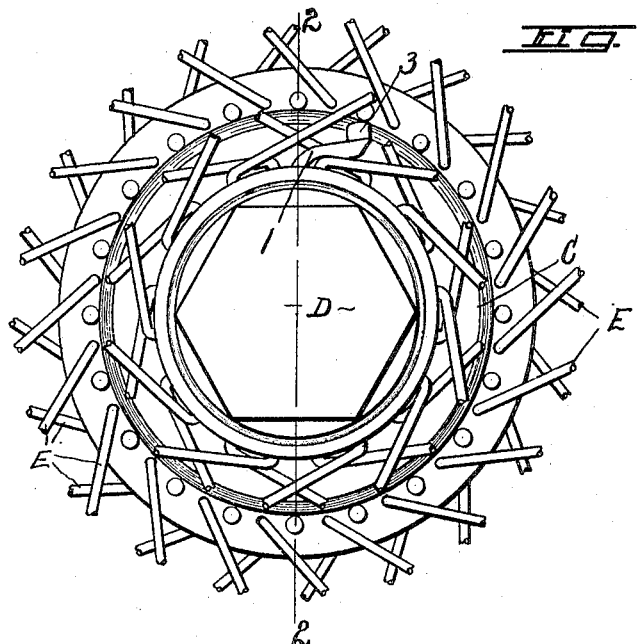
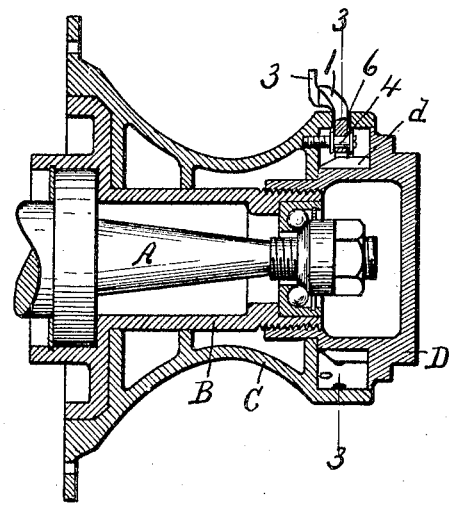
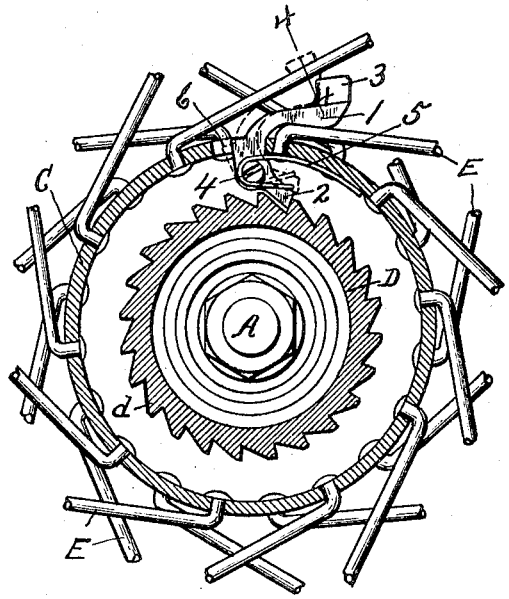
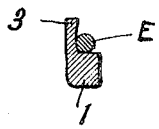
WITNESSES:
INVENTORS
Walter L. Ringling and
George Greenlee
BY Howard P. Denison
ATTORNEY.

UNITED STATES PATENT OFFICE.

WALTER L. RINGLING AND GEORGE GREENLEE, OF GENEVA, NEW YORK, ASSIGNORS TO NATIONAL WIRE WHEEL WORKS, INC., OF GENEVA, NEW YORK, A CORPORATION OF NEW YORK.

LOCKING DEVICE FOR DEMOUNTABLE WHEELS.

1,317,393.  Specification of Letters Patent.  Patented Sept. 30, 1919.

Application filed March 30, 1917. Serial No. 158,584.

*To all whom it may concern:*

Be it known that we, WALTER L. RINGLING, a subject of Great Britain, and GEORGE GREENLEE, citizen of the United States of America, and residents of Geneva, in the county of Ontario, in the State of New York, have invented new and useful Improvements in Locking Devices for Demountable Wheels, of which the following, taken in connection with the accompanying drawings, is a full, clear, and exact description.

This invention relates to certain improvements in demountable wheels, preferably of the wire-spoke type, involving the use of an inner hub which is journaled on the axle and an outer hub on the wheel proper which is removably mounted on the inner hub and held in place by a suitable cap screwing upon the inner hub and engaging the outer hub.

The main object is to provide simple and efficient means for locking the cap section in its adjusted position against accidental backing off or unscrewing from the inner hub section, and at the same time permitting the removal of the cap whenever it is desired to remove the wheel by the simple adjustment of the cap-holding means or detent.

Another object is to locate this detent in such position that it will be protected against breaking or displacement by contact with external objects.

A further object is to establish such relation between the detent and spokes that one or the other of the spokes may be utilized as a temporary retaining means for frictionally holding the detent in its tripped position, and also to effect the automatic release of the detent by the slightest jar of the spoke with which it may be engaged, as for example, in case the detent should be inadvertently left in such position when the machine is started, the vibration of the spokes serving to automatically release the same.

Other objects and uses relating to specific parts of the locking device will be brought out in the following description.

In the drawings—

Figure 1 is an end view of the central portion of a demountable wheel embodying our improved locking device.

Fig. 2 is a longitudinal sectional view taken on line 2—2, Fig. 1, except that the spokes are omitted.

Fig. 3 is an enlarged transverse sectional view taken in the plane of line 3—3, Fig. 2.

Fig. 4 is a detail sectional view of the outer end of the detent shown as frictionally engaged with one of the spokes.

In order that our invention may be clearly understood, we have shown a portion of an axle —A—, upon which is rotatably mounted an inner hub section —B— adapted to receive and support an outer hub section —C—, the inner end of the hub section —B— being enlarged to form an abutment against which the corresponding end of the outer hub section —C— normally rests when the wheel is adjusted for use.

The outer end of the inner hub section —B— is threaded externally and engaged by an internally threaded screw cap —D— having the periphery of the central portion provided with a series of ratchet teeth —d—, the outer hub section and cap being provided with annular shoulders normally engaging with each other to hold the outer hub section in operative position upon the inner section —B— to rotate therewith.

A one-piece locking device consisting of a detent —1— is pivoted at —4— to an inwardly projecting transverse wall of the outer hub section —C—, as shown more clearly in Figs. 2 and 3, and is provided at its inner end with an integral portion —2— which is movable into and out of engagement with the teeth of the cap —D— to lock and release the latter in and from its adjusted position.

The other end of the detent extends through an opening —6— in the periphery of the outer end of the hub section —C— and is provided with a laterally offset portion —3— for frictional engagement with the inner face of one of the adjacent spokes, as —E—, for temporarily holding the detent in its tripped position when it is desired to adjust the cap —D— rotatably, as in removing the same preparatory to removing the wheel proper from the inner hub section —B—.

It will be observed that the pawl or detent —1— is located in substantially the same transverse or circumferential plane as the inner ends of the outer set of spokes and between the inner ends of two adjacent spokes of the same set, the purpose of which is to protect the pawl or detent against injury or displacement from its adjusted position by contact with external objects, the spokes constituting the projecting medium.

A retracting spring —5— is coiled around the pivotal pin —4— with one end engaged with the ratchet-engaging extension —2—, and its other resting against the inner face of the outer end of the hub section —C—, the purpose of which is to hold the detent in engagement with the ratchet teeth —d—.

The offset portion —3— lies in substantially the same plane as that of the inner face of the spoke with which it is adapted to engage so that when the outer end of the detent constituting a handle or finger-piece is rocked outwardly, the outer face of the offset portion —3— will ride against the inner face of the adjacent spoke —E—, thereby springing the latter outwardly to a very slight extent, but sufficient to cause enough friction between the two parts to temporarily hold the detent in its unlocked position when the wheel is at rest.

In case the detent should be inadvertently left in its unlocked position with the offset —3— in frictional engagement with the adjacent spoke —E—, the motion of the wheel and consequent vibration of the spokes will be sufficient to automatically release the detent from frictional engagement therewith, thus allowing the spring —5— to return the detent to its locking position in engagement with the teeth —d— of the cap —D—, thereby assuring the locking of the cap against backing off from the threaded portion of the inner hub section —B—.

What we claim is:

1. In a demountable wheel, the combination of an inner hub section, an outer hub section mounted thereon, a cap screwing on the outer end of the inner hub section and provided with ratchet teeth upon its periphery, inner and outer sets of spokes attached to the outer hub section, and a detent pivoted to the outer hub section and coöperating with the ratchet teeth to hold the cap against unscrewing from the inner hub section, said detent extending outwardly through an opening in the periphery of the outer hub section and disposed in approximately the same plane as that of the inner ends of the outer set of spokes, said detent having an offset portion for frictional interlocking engagement with one of the adjacent spokes to temporarily hold the detent in its unlocked position.

2. In a demountable wheel, the combination of an inner hub section, an outer hub section mounted thereon, a cap screwing on the inner hub section for holding the outer hub section in operative position and provided with ratchet teeth upon its periphery, a one-piece detent pivoted to the outer hub section and provided with means for engaging the ratchet teeth, a spring normally tending to force said detent into engagement with the ratchet teeth, said detent extending outwardly through an opening in the periphery of the outer hub section and provided with means for frictional interlocking engagement with one of the spokes of the wheel to temporarily hold the detent in its unlocked position.

3. In a demountable wheel, the combination of an inner hub section, an outer hub section mounted thereon, a cap screwing upon the inner section for holding the outer hub section in fixed relation thereto, a set of wire spokes extending outwardly from the outer end of the outer hub section, and means for locking the cap against unscrewing including a detent disposed in approximately the same plane as that of the inner ends of the spokes and between the inner ends of two adjacent spokes.

4. In a demountable wheel, the combination of an inner hub section, an outer hub section mounted thereon, a cap screwing upon the inner section for holding the outer hub section in fixed relation thereto, a set of wire spokes extending outwardly from the outer end of the outer hub section, and means for locking the cap against unscrewing including a detent having means for frictional interlocking engagement with one of the spokes to temporarily hold it in its unlocked position.

In witness whereof we have hereunto set our hands this 22nd day of March, 1917.

WALTER L. RINGLING.
GEORGE GREENLEE.

Witnesses:
GEORGE G. HANDLAN,
HENRY B. GRAVES.